(12) United States Patent
Bouchard et al.

(10) Patent No.: US 8,902,153 B2
(45) Date of Patent: Dec. 2, 2014

(54) ELECTRO-OPTIC DISPLAYS, AND PROCESSES FOR THEIR PRODUCTION

(75) Inventors: Alain Bouchard, Dorchester, MA (US); Thomas H. Whitesides, Victoria (CA); Michael D. Walls, Dorchester, MA (US); Steven P. Dudek, Menlo Park, CA (US)

(73) Assignee: E Ink Corporation, Billerica, MA (US)

(*) Notice: Subject to any disclaimer, the term of this patent is extended or adjusted under 35 U.S.C. 154(b) by 434 days.

(21) Appl. No.: 13/032,914

(22) Filed: Feb. 23, 2011

(65) Prior Publication Data

US 2011/0310461 A1 Dec. 22, 2011

Related U.S. Application Data

(63) Continuation-in-part of application No. 11/833,578, filed on Aug. 3, 2007, now Pat. No. 7,910,175.

(51) Int. Cl.
  *G09G 3/34* (2006.01)
  *H04N 9/10* (2006.01)
  *G06K 9/00* (2006.01)
  *G02B 26/00* (2006.01)

(52) U.S. Cl.
  USPC .......... 345/107; 345/72; 345/83; 345/88; 348/196; 348/223.1; 348/225.1; 348/256; 348/266; 348/277; 348/335; 348/742; 348/816; 382/162; 382/164; 359/296

(58) Field of Classification Search
  USPC ........... 345/22, 589, 592, 593, 597, 600, 605, 345/695, 72, 83, 88, 107; 348/196, 223.1, 348/225.1, 256, 259, 266, 268, 269, 271, 348/273, 274, 277–279, 335, 336, 742, 743, 348/816, 817; 382/162, 164, 167, 260; 359/296

See application file for complete search history.

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |

(Continued)

FOREIGN PATENT DOCUMENTS

| | | |
|---|---|---|
| EP | 1 099 207 B1 | 3/2002 |
| EP | 1 145 072 B1 | 5/2003 |

(Continued)

OTHER PUBLICATIONS

Kitamura, T., et al., "Electrical toner movement for electronic paper-like display", Asia Display/IDW '01, p. 1517, Paper HCS1-1 (2001).

(Continued)

*Primary Examiner* — Evelyn A. Lester
(74) *Attorney, Agent, or Firm* — David J. Cole

(57) ABSTRACT

A color display has continuous areas of a single color covering a plurality of sub-pixel electrodes. Each sub-pixel of a given color has sub-pixels of the same given color disposed along at least two of its adjacent edges. Each area of a single color may cover a 2×2 array of sub-pixel electrodes. The colors used may be red/green/blue/white (RGBW), red/green/blue/yellow (RGBY), or orange/lime/purple/white.

11 Claims, 6 Drawing Sheets

(56) References Cited

U.S. PATENT DOCUMENTS

| | | |
|---|---|---|
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,933,098 B2 | 8/2005 | Chan-Park et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,369,299 B2 | 5/2008 | Sakurai et al. |
| 7,375,875 B2 | 5/2008 | Whitesides et al. |

(56) References Cited

U.S. PATENT DOCUMENTS

| | | |
|---|---|---|
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,674 B2 | 1/2010 | Danner et al. |
| 7,667,684 B2 | 2/2010 | Jacobson et al. |
| 7,672,040 B2 | 3/2010 | Sohn et al. |
| 7,679,599 B2 | 3/2010 | Kawai |
| 7,679,814 B2 | 3/2010 | Paolini et al. |
| 7,688,297 B2 | 3/2010 | Zehner et al. |
| 7,705,823 B2 | 4/2010 | Nihei et al. |
| 7,705,824 B2 | 4/2010 | Baucom et al. |
| 7,728,811 B2 | 6/2010 | Albert et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,787,169 B2 | 8/2010 | Abramson et al. |
| 7,839,564 B2 | 11/2010 | Whitesides et al. |
| 7,843,621 B2 | 11/2010 | Danner et al. |
| 7,859,637 B2 | 12/2010 | Amundson et al. |
| 7,893,435 B2 | 2/2011 | Kazlas et al. |
| 7,903,319 B2 | 3/2011 | Honeyman et al. |
| 7,910,175 B2 | 3/2011 | Webber et al. |
| 7,952,557 B2 | 5/2011 | Amundson et al. |
| 7,952,790 B2 | 5/2011 | Honeyman et al. |
| 7,999,787 B2 | 8/2011 | Amundson et al. |
| 8,009,348 B2 | 8/2011 | Zehner et al. |
| 8,018,640 B2 | 9/2011 | Whitesides et al. |
| 8,035,886 B2 | 10/2011 | Jacobson |
| 8,054,526 B2 | 11/2011 | Bouchard |
| 8,064,962 B2 | 11/2011 | Wilcox et al. |
| 8,115,729 B2 | 2/2012 | Danner et al. |
| 8,125,501 B2 | 2/2012 | Amundson et al. |
| 8,129,655 B2 | 3/2012 | Jacobson et al. |
| 8,139,050 B2 | 3/2012 | Jacobson et al. |
| 8,174,490 B2 | 5/2012 | Whitesides et al. |
| 8,466,852 B2 | 6/2013 | Drzaic et al. |
| 8,558,783 B2 | 10/2013 | Wilcox et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2004/0155857 A1* | 8/2004 | Duthaler et al. ............. 345/107 |
| 2005/0001810 A1 | 1/2005 | Yakushiji et al. |
| 2005/0012980 A1 | 1/2005 | Wilcox et al. |
| 2005/0018273 A1 | 1/2005 | Honeyman et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0253777 A1 | 11/2005 | Zehner et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0181504 A1 | 8/2006 | Kawai |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0211002 A1 | 9/2007 | Zehner et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0054879 A1 | 3/2008 | LeCain et al. |
| 2009/0179842 A1* | 7/2009 | Chen et al. .................... 345/88 |

FOREIGN PATENT DOCUMENTS

| | | |
|---|---|---|
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Yamaguchi, Y., et al., "Toner display using insulative particles charged triboelectrically", Asia Display/IDW '01, p. 1729, Paper AMD4-4 (2001).

Hayes, R.A., et al., "Video-Speed Electronic Paper Based on Electrowetting", Nature, vol. 425, Sep. 25, pp. 383-385 (2003).

\* cited by examiner

ELECTRO-OPTIC DISPLAYS, AND PROCESSES FOR THEIR PRODUCTION

REFERENCE TO RELATED APPLICATIONS

This application is a continuation-in-part of application Ser. No. 11/833,578, filed Aug. 3, 2007 (Publication No. 2008/0023332, now U.S. Pat. No. 7,910,175, issued Mar. 22, 2011).

This application is also related to application Ser. No. 09/349,806, filed Jul. 8, 1999 (Publication No. 2002/0113770), now abandoned, and to application Ser. No. 10/817,464, filed Apr. 2, 2004 (Publication No. 2004/0190114, now U.S. Pat. No. 7,667,684, issued Feb. 23, 2010), which is a continuation of the aforementioned application Ser. No. 09/349,806. This application is also related to U.S. Pat. No. 7,339,715.

The entire contents of the aforementioned applications, and of all other U.S. patents and published and copending applications mentioned below, are herein incorporated by reference.

BACKGROUND OF INVENTION

This invention relates to electro-optic displays, and processes for the production of such displays. Some of the processes of the invention relate particularly to the production of electrophoretic displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "pixel" is used herein in its conventional meaning in the electro-optic display art to mean the smallest area of a display which can display the full range of colors capable of being shown by the display. In a color display, each pixel is itself composed of a plurality of sub-pixels having differing colors, a sub-pixel being the smallest unit of a display which can be independently controlled. Typically, in a color display, each pixel comprises three or four sub-pixels of differing colors, for example, red, green and blue, or red, green, blue and white. (For purposes of the present invention, white is regarded as a color.)

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Particle-based electrophoretic display, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,693,620; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,220; 6,958,848; 6,967,640; 6,980,196; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,290; 7,236,292; 7,242,513; 7,247,379; 7,256,766; 7,259,744; 7,280,094; 7,304,634; 7,304,787; 7,312,784; 7,312,794; 7,312,916; 7,327,511; 7,339,715; 7,349,148; 7,352,353; 7,365,394; and 7,365,733; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0257635; 2004/0263947; 2005/0000813; 2005/0007336; 2005/0012980; 2005/0018273; 2005/0024353; 2005/0062714; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; 2007/0286975; 2007/0286975; 2008/0013155; 2008/0013156; 2008/0023332; 2008/0024429; 2008/0024482; 2008/0030832; 2008/0043318; 2008/0048969; 2008/0048970; 2008/0054879; 2008/0057252; and 2008/0074730; and International Applications Publication Nos. WO 00/38000; WO 00/36560; WO 00/67110; and WO 01/07961; and European Patents Nos. 1,099,207 B1; and 1,145,072 B1.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

One major reason why encapsulated electrophoretic displays can be produced inexpensively by printing processes is that the electrophoretic medium itself has substantial mechanical strength and cohesion; typically the individual capsules are bound together by a polymeric binder to increase the cohesion of the layer. Thus, not only can the display medium itself be printed, but as described in U.S. Pat. No. 6,177,921, an electrode may be formed by printing a conductive material directly on to the electrophoretic medium; alternatively, an electrode pre-formed on a substrate can be laminated on to the electrophoretic medium, which is able to withstand the heat and pressure required for such lamination without damage. In such printed or laminated structures, the mechanical strength and cohesion of the electrophoretic medium maintain the requisite spacing between the electrodes disposed on either side of the medium without any need for mechanical spacers or similar devices to control this spacing. Accordingly, if the electrodes (and any substrates attached thereto) are flexible, the encapsulated electrophoretic display can be curved or rolled without affecting the display qualities of the device; see, for example, Drzaic et al., A Printed and Rollable Bistable Electronic Display SID (Society for Information Display) 98 Digest, page 1131 (1998), which illustrates a flexible encapsulated electrophoretic display being rolled around a pencil without damage.

Furthermore, because of the mechanical strength and cohesion of the electrophoretic medium, such a medium can in principle be applied to any substrate on which an electrode can be provided; for example, the substrate could have an arbitrary three-dimensional shape, as opposed to an essentially laminar sheet which is curved in one dimension. Techniques such as sputtering may be used to apply electrodes to arbitrary three-dimensional shapes, but prior art techniques for applying an electrophoretic medium to such arbitrary shapes leave a great deal to be desired, especially given the need for careful control of the deposition of such a medium to produce optimum optical performance.

Display performance (e.g., its optical performance) and visual appeal (i.e., minimizing visual defects) depends critically on obtaining a high quality coating, that is coatings are preferably of uniform thickness (often a monolayer of capsules is desirable), and contain a high areal density of capsules with a minimum of defects. For example, regions where capsules are not in contact with the electrode or where the surface density of capsules varies laterally with respect to the substrate, or where the coating thickness varies, show up as a degraded dark or white states, non-uniformity in the optical state or graininess, or as non-uniformities during switching respectively.

Some of the printing/coating techniques described above can produce high quality printings/coatings of capsules on to planar or flexible substrates; during coating, flexible substrates are usually constrained so that at least one of the radii of curvature of the substrate is infinite, i.e., the substrate is held in a cylindrical form with the axis of the cylinder perpendicular to the direction of coating. In particular, certain of the aforementioned E Ink and MIT patents and applications describe the use of a metered slot coating technique to produce monolayer capsule coatings and lamination adhesive coatings suitable for use in commercial products.

However, as already mentioned these prior art techniques are not satisfactory for forming, on arbitrary three-dimensional shapes, electrophoretic medium coatings with a sufficiently uniform thickness to give optimum optical performance. While coating methods such as dip or spray coating can be applied to arbitrary three-dimensional shapes, it is difficult to or impossible to achieve uniform capsule monolayers over the substrate surface using these coating techniques.

Other problems encountered with slot coating techniques include:
 (a) chatter-like streaks parallel to the coating head (for example, due to vibrations in the coating apparatus); these streaks are believed to result from periodic bunching or jamming of capsules;
 (b) streaking in the direction of coating (i.e., perpendicular to the slot of the coating head), believed to be due to capsule jamming or non-uniform flows in delivery of capsules to the coating head;
 (c) less than desirable capsule contact (or wetting) with the optical face due to inadequate settling or deformability of the small capsules (of the order of 20-200 µm) typically used in encapsulated electrophoretic displays; and
 (d) non-uniformities in coating thickness due to formation of multiple layers of capsules (see the aforementioned U.S. Pat. No. 6,839,158 for a discussion of the advantages of forming only a single layer of capsules on a substrate).

The presence of these types of defects can adversely affect the appearance and optical performance of the display.

Also, as is well known to those skilled in slot coating technology, slot coating imposes limitations upon the viscosity and other physical properties of the material being coated, and typically requires the addition of slot coating additives to control the rheology of the coated material to ensure that the coating does not flow and develop non-uniformities in thickness prior to drying. As discussed in many of the aforementioned E Ink and MIT patents and applications, typically the capsules are mixed with a polymeric binder prior to coating, this polymeric binder serving to form the capsules into a coherent layer after coating and drying. The capsule/binder mixture is then coated on to a polymeric film substrate bearing a conductive coating of indium tin oxide (ITO) or a conductive polymer and dried to form a coherent layer on the conductive-coating bearing surface of the substrate; the opposed surface of the substrate forms the viewing surface of the final display. Although the binder serves several useful functions, including ensuring adequate adhesion of the capsule film to the substrate on which it is coated, excessive amounts of binder can hinder capsule contact with the electrode which is normally present on the substrate, and may also hinder the desirable flattening of the faces of the capsules in contact with the conductive coating (see, for example, the aforementioned U.S. Pat. No. 6,067,185). Because the binder typically has a substantial effect on the viscosity and other physical properties of the capsule/binder mixture, at least in some cases it may be difficult to reduce the amount of binder used and still maintain these physical properties at values compatible with slot coating.

Also, some of the aforementioned E Ink and MIT patents and applications (see especially 2002/0113770) describe displays in which more than one type of capsule is used, the plurality of types of capsules being arranged in a predetermined pattern on a substrate. For example, a full color display could make use of three different types of capsules, say white/red, white/green and white/blue arranged in stripes of triads; such a display could achieve full color without requiring a color filter of the type used in full color liquid crystal displays. However, while conventional printing techniques might be used to prepare large displays of this type having resolutions of (say) less than 10 lines per inch (approximately 0.4 lines per mm), producing high resolution displays of this type with resolutions of about 100 lines per inch (approximately 4 lines per mm) with such conventional techniques is very difficult. Again, while spray or ink jet coating might be used to apply the patterned coatings of capsules, producing monolayer capsule coatings using these methods will be difficult or impossible.

Improved methods for achieving patterned deposition of encapsulated electrophoretic media would facilitate several applications of electrophoretic displays that are presently difficult or impossible to achieve. Also, improved patterned deposition of electrophoretic media could improve the properties of several kinds of displays presently made by other processes. For example, spot-color displays can be made by superposing a colored film on top of a monochrome (black and white) display. If the backplane driving the display is appropriately segmented and connected to appropriate electronics, the part of the monochrome display under the colored film can be driven separately from the rest of the display so as to produce an area of color in addition to monochrome information. The colored film must be registered with the backplane, and the displayed color can only be that of the film, plus black. Switching between two colors (red plus blue, for example) is not possible in this type of display. Patterned electrophoretic medium deposition would allow deposition of media of arbitrary colors and color combinations. Media deposition registered with backplane segments would obviate the registration step, and could be used to provide high resolution flexible color applications.

Full color displays require separate addressing of (typically) three or four differently colored sub-pixels. Most prior art full color electrophoretic (and other electro-optic) displays have used a registered color filter array superposed on a monochrome display driven by an active matrix backplane. An alternative way of achieving a full color electrophoretic display would be to use the same backplane with a patterned array of electrophoretic media containing appropriate sets of electrophoretic particles (most commonly, red plus black, green plus black, blue plus black, and optionally white plus black). Using multiple electrophoretic media in this way has several advantages in the construction of highly flexible full color displays, including avoiding difficulties in registration, especially registration when the display is flexed.

The present invention seeks to provide processes for the production of electrophoretic displays, and in particular for processes for depositing capsules on a substrate, which reduce or eliminate the problems of the prior art processes for depositing capsules described above. Some processes of the present invention can be used to produce full color displays. The present invention also provides apparatus for use in this process.

The present invention also provides improvements in the type of electrophoretic and other electro-optic displays which use a color filter array ("CFA") registered with a monochrome display driven by an active (or possibly passive) matrix backplane (this type of display may hereinafter be termed a "CFA display"). Conventionally, a CFA display is manufactured by superimposing a CFA in (theoretically) perfect registration with a backplane, both the CFA and the backplane having the same resolution, i.e., the spacing between the sub-pixels of the CFA being the same as the spacing between the pixel electrodes of the backplane. There is commercial pressure to increase the resolution of color electro-optic displays in order to avoid the individual pixels being apparent to some customers; for example, some monochrome electronic book reader (E-book reader) displays have a resolution of 166 dpi (about 6.7 dots per mm). If the same backplane is used for an RGBW color display with the red, green, blue and white sub-pixels of each color pixel arranged in a 2×2 matrix, the resolution of the color display drops to 88 dpi (about 3.4 dots per mm), which is objectionable to many users who find the individual pixels readily visible.

It has been suggested that the resolution of the display be doubled to make the pixel less visible. However, if one simply doubles the resolution of both the CFA and the backplane, the length of sub-pixel edges (the lines between one sub-pixel and an adjacent sub-pixel of a different color) will also double. As discussed in more detail below, in practice the sub-pixel edges are subject to certain edge effects which compromise the color rendering of the display by causing desaturation and darkening of the primary colors. The magnitude of these edge effects is a function of the length of the sub-pixel edges, and doubling the length of the sub-pixel edges will also double the associated edge effects. Such edge effects can cause serious adverse effects upon the color rendering properties of the display. For example, in one commercial form of electrophoretic display, it has been estimated that changing the size of sub-pixels from 152 µm (167 dpi) to 76 µm (334 dpi) will result in a reduction of about 30 percent in the original color gamut of the display.

One aspect of the present invention relates to a color display in which high resolution can be achieved without excessive edge effects due to adjacent sub-pixels of differing colors. The problems with CFA's described above also apply to displays which use multiple electro-optic media having different colors to form the colored pixels (so-called "inherent color displays"), and the present invention can also be applied to such color displays.

SUMMARY OF INVENTION

The following description of the various aspects of the present invention will assume familiarity with the process described and claimed in the aforementioned U.S. Pat. No. 7,339,715 which, as already mentioned, is incorporated in its entirety herein by reference. Basically, this patent describes a process for forming a coating of an encapsulated electrophoretic medium on a conductive portion of a substrate, the process comprising: dispersing in a fluid a plurality of capsules each comprising a capsule wall, a fluid encapsulated within the capsule wall and a plurality of electrically charged particles disposed in the fluid and capable of moving therethrough on application of an electric field to the capsule; contacting the conductive portion of the substrate with the fluid; and applying a potential difference between the conductive portion of the substrate and a counter-electrode in electrical contact with the fluid, thereby causing capsules to be deposited upon the conductive portion of the substrate.

This patent also describes apparatus for forming a coating of an encapsulated electrophoretic medium on a substrate comprising a conductive layer. the apparatus comprising: a coating die having walls defining an aperture and means for supplying a fluid form of the encapsulated electrophoretic medium to the aperture; transport means for moving the substrate in one direction past the coating die; an electrode arranged adjacent the aperture in the coating die such that the substrate passes the electrode after having passed the coating die; and voltage supply means arranged to apply a voltage between the electrode and the conductive layer of the substrate.

In one aspect, this invention provides a process for forming a coating of an encapsulated electrophoretic medium on a substrate comprising a conductive layer, the process comprising:

contacting the substrate with a fluid form of the encapsulated electrophoretic medium; and while the substrate is in contact with the fluid form, moving the substrate past an electrode while applying a voltage between the electrode and the conductive layer of the substrate, the voltage being varied with time such that the electrophoretic medium is deposited on a plurality of discrete areas of the substrate, these discrete areas being separated by areas in which electrophoretic medium is not deposited on the substrate.

In this process, after deposition of the electrophoretic medium on discrete areas of the substrate, the substrate may be washed to remove electrophoretic medium therefrom. The electrophoretic medium may also be cured (a term which is used herein to cover drying, cross-linking or any other method used to convert fluid versions of electrophoretic media to solid versions thereof) after washing. The electrode will typically have a width, measured perpendicular to the direction of movement of the substrate, at least twice as great as its length, measured parallel to the direction of movement of the substrate; the width to length ratio may be much greater than two. The substrate may be provided with markings, and the process may include detecting these markings and using the detection of the markings to control the variation of the voltage applied between the electrode and the conductive layer of the substrate. The markings may have the form of a plurality of spaced bars extending substantially perpendicular to the direction of movement of the substrate.

Certain variants of the aforementioned process are especially useful for forming color displays comprising multiple types of electrophoretic medium. For example, in one such variant of the present process, after deposition of the electrophoretic medium on discrete areas of the substrate, non-deposited electrophoretic medium is removed from the substrate, and the substrate is then contacted with a fluid form of a second encapsulated electrophoretic medium. While the substrate is in contact with the fluid form of the second encapsulated electrophoretic medium, the substrate is moved past an electrode while a voltage is applied between the electrode and the conductive layer of the substrate, this voltage being varied with time such that the second electrophoretic medium is deposited on a plurality of discrete areas of the substrate not occupied by the previously-deposited ("first") electrophoretic medium. The plurality of discrete areas of the substrate on which the first electrophoretic medium is present may have the form of stripes extending perpendicular to the direction of movement of the substrate, and the second electrophoretic medium may be deposited as a series of stripes substantially parallel to but spaced from the stripes of the first electrophoretic medium. Alternatively, if the plurality of discrete areas of the substrate, on which the first electrophoretic medium is present, have the form of stripes extending perpendicular to the direction of movement of the substrate, the movement of the substrate during contact with the fluid form of the second electrophoretic medium may be substantially parallel to the stripes of the first-deposited electrophoretic medium, so that the second electrophoretic medium is deposited as a series of broken stripes running substantially perpendicular to the stripes of the first electrophoretic medium. In any event, after deposition of the second electrophoretic medium on the substrate, non-deposited second electrophoretic medium may be removed from the substrate, and the substrate contacted with a fluid form of a third encapsulated electrophoretic medium, thereby depositing the third electrophoretic medium on areas of the substrate not occupied by the first and second electrophoretic media. While the substrate is in contact with the fluid form of the third encapsulated electrophoretic medium, the substrate may be moved past an electrode while applying a voltage between the electrode and the conductive layer of the substrate, the voltage being varied with time such that the third electrophoretic medium is deposited on areas of the substrate not occupied by the first and second electrophoretic media. For example, the three electrophoretic media may be deposited as a series of cyclically repeating parallel stripes. Alternatively, in the previously-discussed variant, in which the plurality of discrete areas of the substrate on which the first electrophoretic medium is present have the form of stripes extending perpendicular to the direction of movement of the substrate, and the second electrophoretic medium is deposited as a series of broken stripes running substantially perpendicular to the stripes of the first electrophoretic medium, the third electrophoretic medium may be deposited on substantially all areas of the substrate not occupied by the first and second electrophoretic media.

In all variants of the present invention, the substrate may comprise a light-transmissive polymeric film and a light-transmissive conductive layer. After deposition of the encapsulated electrophoretic medium the substrate/electrophoretic medium sub-assembly thus produced may be laminated to a second sub-assembly comprising a lamination adhesive layer and a release sheet, with the lamination adhesive layer being laminated to the electrophoretic medium, thus forming a front plane laminate as described in the aforementioned U.S. Pat. No. 6,982,178.

The invention extends to an electrophoretic display produced a process of the present invention. Such displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

Certain variants of the process described above can be used (as illustrated below) to form colored displays in which the size of the areas having the same color (whether these colored areas are defined by differing colored electro-optic media or by colored areas of a color filter array) differs from those of the sub-pixel electrodes. However, the colored displays of the present invention are not restricted to any particular process used for their production.

Accordingly, in another aspect this invention provides a color display having areas of at least three different colors, the areas of different colors forming continuous areas of a single color each covering a plurality of sub-pixel electrodes, the continuous areas of a single color and the sub-pixel electrodes being arranged such that the sub-pixels are rectangular and each sub-pixel of a given color has sub-pixels of the same given color disposed along at least two of its adjacent edges.

In one form of such a color display, the display has continuous areas of three different colors, the continuous areas of a first color having the form of a series of spaced parallel stripes and the continuous areas of the second and third colors having the form of alternating rectangles of the second and third colors disposed in the spaces between the spaced parallel stripes of the first color.

Another form of such a color display, has continuous areas of four different colors, with each area of a single color covering a N×n array of sub-pixel electrodes, where N and n are integers. In such a display, a single color pixel of the display is commonly a 2×2 array of sub-pixels, but 3×3 and 4×4 arrays, or even larger arrays. When the individual colored areas are arranged as stripes, it is also possible to use sub-pixel arrangements having differing numbers of sub-pixels in the two dimensions, such as 3×2 and 4×2 sub-pixel arrangements. A tetrachromatic color display of the present invention may be a red/green/blue/white (RGBW) or red/green/blue/yellow (RGBY) display but other color combinations are possible; for example, the sub-pixels may use the orange/lime/purple/white (OLPW) color combination described in US 2009/0237776. In such a tetrachromatic color display in which each single color area covers a 2×2 array of sub-pixel electrodes, the four areas defined by the sub-pixel electrodes may belong to four different pixels.

The color display of the present invention enable edge effects to be reduced, since each sub-pixel of a given color has two neighboring sub-pixels of the same color (for purposes of this application, two sub-pixels are regarding as neighboring when they share a common edge; sub-pixels which share only a corner are not regarded as neighboring), and (for reasons explained below) there are no edge effects between neighboring sub-pixels having the same color.

DETAILED DESCRIPTION

Figure 1A:
FIGS. 1A-1D illustrate various templates which can be used to control the deposition of multiple types of capsules on a substrate in accordance with a preferred variant of the process of the present invention.

As already mentioned, U.S. Pat. No. 7,339,715 describes a process for forming a coating of an encapsulated electrophoretic medium on a substrate. In this process, there are dispersed in a fluid a plurality of capsules, each of which comprises a capsule wall, a fluid encapsulated within the capsule wall and a plurality of electrically charged particles disposed in the fluid and capable of moving therethrough on application of an electric field to the capsule. A conductive portion of a substrate is contacted with the fluid, and a potential difference is applied between this conductive portion of the substrate and a counter-electrode in electrical contact with the fluid. The application of this potential difference causes capsules to be deposited upon the conductive portion of the substrate. Thus, in this process the capsules are electrophoretically deposited on a predetermined portion of the substrate, and the process may hereinafter for convenience be referred to as the "electrophoretic capsule deposition process" or "ECD process".

In one variant of this process, the substrate bears one or more electrodes, and a voltage is applied to these electrodes, simultaneously or sequentially, to deposit capsules on the electrodes. Sequential application of voltage to differing groups of electrodes permits the capsule-containing fluid to be changed between the application of voltage to the differing groups, and thus allows differing types of capsules to be deposited upon the differing groups of electrodes. Thus, the process may advantageously be used to prepare the type of display previously discussed in which different types of capsules are patterned on to differing areas of a substrate, for example to produce a full color display. A typical full color display of this type will be an active matrix display having a common electrode (extending over the whole display, or at least a large number of pixels thereof) on one side of the electrophoretic medium and a matrix of pixel electrodes, one for each pixel of the display, on the opposed side of the electrophoretic medium. In such an active matrix display, there will of course be separate sets of pixel electrodes for the red, green and blue (or other colors used) pixels. The process allows for easy patterning of the various types of capsules on to the pixel electrodes. For example, the matrix of pixel electrodes may first be contacted with a dispersion of "red" capsules (i.e., the capsules required to be patterned on to the red pixels of the display) and the potential difference applied only between the pixel electrodes for the red pixels of the display and the counter-electrode, so that the red capsules are deposited only upon the "red" pixel electrodes. After drying, and optionally curing, of the red capsule layer thus deposited, the process is then repeated for the green and blue capsules, thus ensuring that all three types of capsules are deposited upon the correct pixel electrodes. Obviously, an exactly similar process may be used to produce a yellow/cyan/magenta display.

As described in the aforementioned US 2008/0023332, the process of U.S. Pat. No. 7,339,715 can be used to deposit multiple types of capsules on a single substrate, the necessary alignment of the various coated areas being achieved by providing an appropriate template for the coating stripes; this template may be printed (or engraved) directly on the substrate or printed on a separate film which is then secured to the substrate. The template is then used to control the voltage applied between the electrode and the substrate. Since the template is permanently attached to the substrate, and is not removed therefrom during washing, drying (or other curing), remounting of the substrate on the coating apparatus, synchronizing the voltage applied between the electrode and the substrate with the template automatically aligns the various stripes of capsules deposited. The template will primarily be described in the form of an optically-encoded stripe (a barcode), but can be provided in a number of other forms, including a mechanical or electro-mechanical device (say a sliding contact, one part attached to the substrate, another to the electrode or the coating head used to deposit the capsules), or a magnetically encoded signal detected by a magnetic read head, or any other similar technique.

Figure 1B:

The template can be a simple series of printed black and white bars, two possible forms of which are illustrated in FIGS. 1A and 5B; these templates are intended to be attached to the substrate with the bars perpendicular to the direction of translation of the substrate during coating. FIG. 1A illustrates regularly spaced bars, with black and white bars of the same width, while FIG. 1B illustrates a template in which the black and white bars have differing widths. A light source (e.g., a laser focused to a fine point on the template) is attached to the coating apparatus, together with a sensor (e.g., a photodiode, possibly equipped with a filter to isolate the laser light wavelength) to detect the reflected laser light. As the substrate and template are translated relative to the coating apparatus, the electrical signal generated by the photodiode can be used to gate the voltage applied between the electrode and the substrate. After the first capsule deposition step, washing and drying, the substrate with the template thereon is remounted on the coating apparatus, and the polarity of the signal from the photodiode reversed, so as to control the second capsule deposition step. The substrate must aligned so that the capsule stripes from the first deposition step are perpendicular to the direction of translation of the substrate, i.e., the substrate must travel in the same direction during both capsule deposition steps. The necessary alignment can be done using mechanical means; for example, an alignment bar, or alignment pins can be provided to mount the substrate on a carrier which moves it past the coating apparatus. However, the spacing of the stripes and their alignment is insensitive to the alignment in the coating direction, and, importantly, to changes in the speed of coating or the frequency of an external waveform generator. This method of controlling capsule deposition may be called "bar-code electrodeposition assisted coating" ("bar-code EDAC", or "BC-EDAC").

Figure 1C:
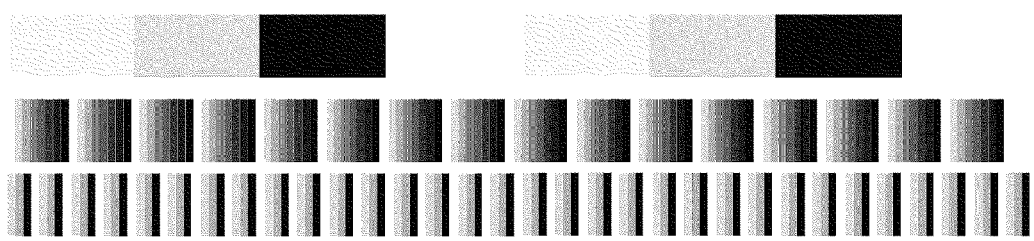
Figure 1D:
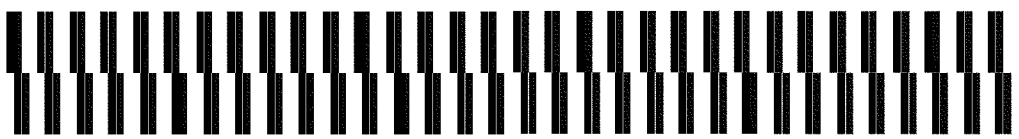

Various other methods of bar coding can be used to control deposition of three or more types of capsules. For example, FIG. 1C illustrates various gray-scale bar-codes. When using such gray-scale bar codes, the applied voltage is controlled by sensing various output ranges from the photodiode. FIG. 1D illustrates a two-bit bar-code using two parallel sets of black and white stripes. Two lasers and/or two photodiodes can be used to control the applied voltage in one of four ways. Several forms of such schemes will be obvious to those skilled in coating technology.

More elaborate patterning of capsules can be effected by using bar-code EDAC with an electrode that is electrically segmented i.e., which is divided into a series of segments insulated from each other so that the voltage between each segment and the substrate can be controlled independently. By coupling information on the bar-code template (giving information about the position of the substrate in a direction parallel to the direction of translation) with electronic control of the various segments of the electrode (giving information about the position in a direction perpendicular to the direction of substrate translation), it is possible to deposit arbitrary patterns of capsules. Full-color displays for attachment to an active matrix backplane could be made in this way, or by simple stripe coating (though stripe coating would require twice as high a resolution), but arbitrary, reprogrammable spot color coating of multiple colors of capsules can be achieved only by such simultaneous control of deposition in two dimensions.

In addition to the bar-coating electrodeposition techniques described above, there are several other ways of using electrodeposition to achieve patterned deposition of capsules for use in electrophoretic displays. For example, a patterned backplane may be used with different segments that can be individually addressed during the electrodeposition step; a segmented printed circuit board (PCB) can be employed in this way. A set of segments is connected together and a voltage may be applied between these segments and a counter-electrode through a slurry of binder and capsules of a first type. The counter-electrode can be in the form of a coating head that moves relative to the PCB, or a stationary electrode that covers the entire surface of the PCB at one time. After an appropriate time and applied voltage, the counter-electrode is removed, the non-deposited capsules are removed by washing, and the coated PCB dried. Only the segments to which voltage was applied will be coated with deposited capsules and binder. It has been found to be advantageous to interconnect all of the segments that are not being coated in a given step so that they are at the same potential as the counter electrode, since this precaution will diminish unwanted deposition of stray capsules on these segments. A different set of segments can be coated with capsules of a second type by repeating the electrodeposition, washing, and drying steps. This procedure can be repeated an arbitrary number of times limited only by the number of different segments on the PCB.

This approach to patterned deposition has the advantage that no alignment steps are necessary during the preparation of a display. The capsules are automatically deposited only on the segments that will power them during display operation. In principle, this process can be extended to very high-resolution displays, such as those used in an active matrix display. In practice, it is necessary that the display electronics be designed to allow the passage of the required currents and the application of the required voltage across the slurry during the electrodeposition step. Active matrix backplanes and backplane electronics designed simply to drive electrophoretic displays commonly cannot supply the required currents or voltages, so either a separate deposition circuit must be designed into the backplane or the electronics designed differently so as to allow the electrodeposition step(s).

It is also possible to use a patterned counter-electrode in a similar way. For example an array of dots of capsules can be prepared by using a counter-electrode in the form of an array of one or more rows of needles. The needles are supported a short distance above an unpatterned conductive substrate in contact with a capsule slurry, or other fluid form of an electrophoretic medium, and a short pulse of current applied between the needles and the substrate. Washing and drying will provide a substrate with an array of capsule dots in register with the needles of the counter-electrode. The counter-electrode can be of essentially any shape, so that any pattern of capsules can be deposited on the conductive substrate. It is desirable that the substrate have the highest possible conductivity, or that the counter-electrode be designed so that portions of it can be powered sequentially, since these techniques will improve the uniformity of capsule deposition. Alternatively, strips of substrate may be coated sequentially; for example, the substrate may be attached to a cylindrical mandrel, which is rolled across the powered counter-electrode during capsule deposition to improve coating uniformity.

Another variant of the process of the present invention permits deposition of up to three different types of capsules without the complication of providing a bar code on the substrate to control the relative positions of the different types of capsules; this variant allows for deposition of three different types of capsules that involves only a single, very simple alignment, namely a rotation of the substrate by 90° (or some other similar angle) between successive coating operations.

As noted above, spaced stripes of capsules separated by stripes free from capsules can be produced by modulating the voltage applied between an electrode and a conductive substrate as the substrate is translated past the electrode. It has been found that stripes with widths of less than or equal to about 1/16th of an inch (about 1.5 mm), separated by gaps of a similar dimension, can be deposited using a rectified square wave potential applied to the electrode as it is translated relative to the substrate, using a typical prior art capsule slurry and an electrode/substrate coating gap of about 3 mils (about 76 µm). The width of the stripes can be controlled by a number of experimental parameters, including the width of the conductive part of the electrode, the potential between electrode and substrate, the duty cycle of the square wave, its frequency, and the speed of translation. Varying some of these parameters has the expected effects. If the frequency of the square wave is increased, or the translation speed reduced, the stripes become narrower and closer together. As the duty cycle changes to positive (with respect to the substrate) pulses of shorter duration, the stripes become narrower, and the gaps between them wider. The dimensions of the electrode, especially the width of its tip portion in the direction of translation, can influence the width of the stripes, so that for narrow stripes the thinnest possible tip width is desirable. The composition of the coating medium is probably also important in this respect.

It has also been found that areas of the substrate on which capsules have already been deposited (especially if the capsules are washed and dried), are very resistant to electrodeposition of a second layer of capsules. For example, once one set of stripes has been produced by the voltage modulation process described above, a second set of stripes of a different color or type from the first can be deposited by electrodeposition without gating the voltage in any way. Thus, uniform stripes of two different capsule types can readily be produced.

It has been found that, if the voltage modulation process described above is repeated with a second type of capsules, but the substrate is rotated by 90° (or a similar angle) between the two coating operations, electrodeposition of the second type of capsules occurs in the form of "broken stripes", i.e., the second type of capsules are not deposited as continuous stripes running at right angles to the stripes of the first type of capsules, but rather as discrete patches between the stripes of the first capsules; the second type of capsules do not deposit in the areas where the stripes of the first capsules are already present. The length (parallel to the long dimension of the first stripes) and frequency of the patches of the second type of capsules are determined by the same consideration as the width of the first stripes (voltage, translation speed, gating frequency, duty cycle, etc.), while the width of the patches (perpendicular to the long dimension of the stripes of the first capsules) is equal to the gaps between the stripes.

After normal washing and drying following the electrodeposition of the second type of capsules, the substrate is left with bare (capsule free) patches having a width equal to that of the gaps between the first stripes and a length equal to the spacing between the patches of the second type of capsules. These bare patches can then be coated with a third type (or color) of capsules by electrodeposition without voltage modulation, thus producing a final substrate being an ordered arrangement of three different types of capsules without requiring the presence of a template on the substrate to control the relative alignment of the three different types of capsules.

Figures 2A, 2B:
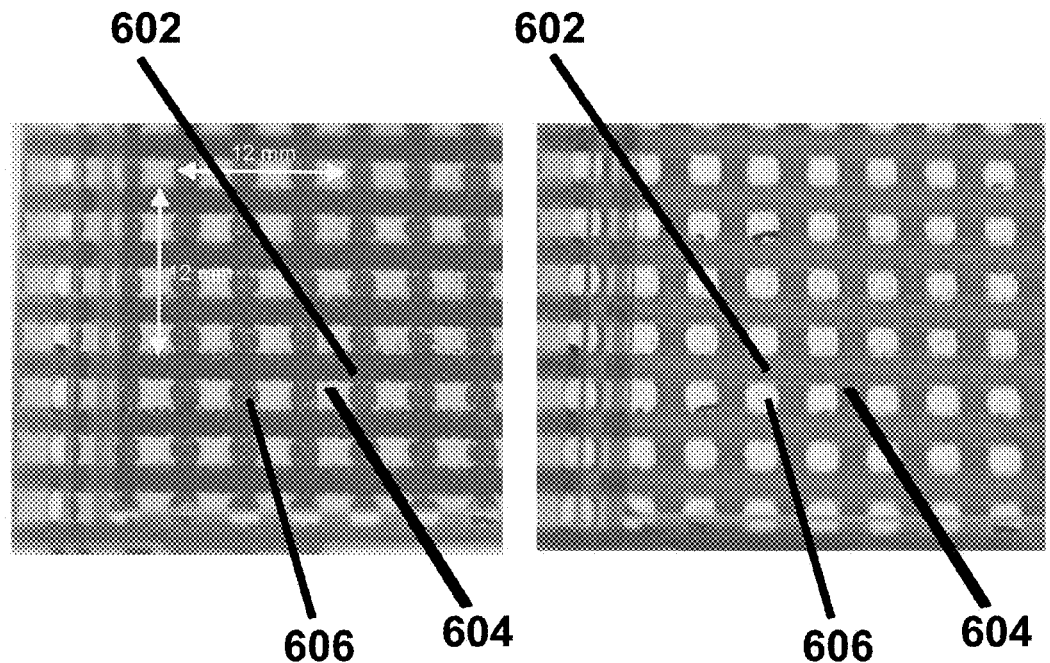
FIGS. 2A and 2B illustrate the two extreme optical states of a substrate coated with an ordered arrangement of three different types of capsules in accordance with a second preferred variant of the present invention.

FIGS. 2A and 2B illustrate the two extreme optical states of an experimental display having an electrophoretic medium layer containing three different types of capsules produced in this manner; the experimental display used a backplane comprising only a single electrode so that all the sub-pixels of the display are switched simultaneously; obviously, a commercial display requires a backplane that allows each sub-pixel to be switched independently.

The electrophoretic medium layer of the display shown in FIGS. 2A and 2B was produced as follows:
  (a) spaced stripes of a first encapsulated electrophoretic medium comprising capsules containing a negatively charged yellow pigment and a positively charged black pigment were deposited in a first, voltage modulated electrodeposition step; the resulting continuous stripes 602 extend horizontally as illustrated in FIGS. 2A and 2B, are black in FIG. 2A and yellow (shown as dark gray) in FIG. 2B;
  (b) after rotating the substrate 90°, broken stripes or patches of a second encapsulated electrophoretic medium comprising capsules containing a negatively charged brown pigment and a positively charged green pigment were deposited in a second, voltage modulated electrodeposition step; the resulting broken stripes 604 extend vertically as illustrated in FIGS. 2A and 2B, are green (shown as light gray) in FIG. 2A and brown (shown as dark gray) in FIG. 2B; and
  (c) the remaining, essentially rectangular areas of the substrate were coated with a third encapsulated electrophoretic medium comprising capsules containing a negatively charged white pigment and a positively charged black pigment in a third, non-voltage modulated electrodeposition step; the resulting coated areas 606 are black in FIG. 2A and white in FIG. 2B.

In the two voltage modulated electrodeposition steps, the translation speed was approximately 3 mm sec$^{-1}$ and the gate frequency was about 1 Hz; the operating voltage was 40V (with the substrate positive with respect to the electrode) and the duty cycle was 30 percent.

The extreme color states of the electrophoretic media used in the experimental display were of course unusual, but similar processes can be carried out using (for example), conventional red/black, green/black, and blue/black (or the corresponding/white) media.

As noted above, a commercial display requires a backplane that allows each sub-pixel to be switched independently, and thus the arrangement of pixel electrodes in the backplane (whether that backplane be of the direct drive type, in which each pixel electrode has a separate conductor by means of which its voltage can be controlled, or of the active matrix type) must conform to the arrangement of color sub-pixels produced by a particular patterning technique. In color electrophoretic media of the type shown in FIGS. 2A and 2B, each color pixel has the form shown in FIG. 3. As shown in that Figure, the geometry of this pixel may be described as resembling a Greek Π. The cross-bar of the Π comprises a first sub-pixel 702 of a first color and formed by a section of one of the continuous stripes of the first electrophoretic medium deposited in the first electrodeposition step. If for simplicity one assumes that a square full-color pixel having equal areas of the three different electrophoretic media is desired (and neither of these assumptions is necessarily true) and that the square full-color pixel has an edge length L, the vertical dimension (as drawn in FIG. 3) of sub-pixel 702 must be L (since the stripes from which sub-pixel 702 is formed are continuous in one dimension) and its horizontal dimension L/3. Thus, to produce the pixel shown in FIG. 3, the first electrodeposition step should be conducted such that the width of the gaps between adjacent stripes is twice the width of the stripes themselves.

Figure 3:
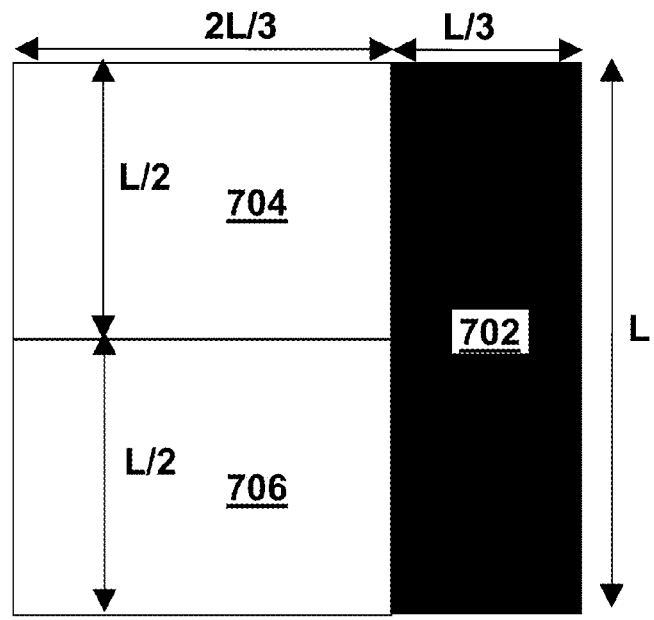
FIG. 3 illustrates the geometric layout of a color pixel comprising three differently colored sub-pixels and capable of being produced by a process similar to that used to produce the coated substrate shown in FIGS. 2A and 2B.

The color pixel shown in FIG. 3 further comprises a second sub-pixel 704 of a second color and formed from one of the patches of the second electrophoretic medium deposited in the second electrodeposition step. Since sub-pixel 704 has a horizontal dimension of 2 L/3, equal to the spacing between the stripes of the first electrophoretic medium, its vertical dimension has to be L/2, as shown in FIG. 3. Thus, to produce the pixel shown in FIG. 3, the second electrodeposition step should be conducted such that the width of the gaps between adjacent patches is equal to the width of the stripes themselves.

Finally, the color pixel shown in FIG. 3 comprises a third sub-pixel 706 of a third color and formed from the third electrophoretic medium deposited in the third, non-voltage modulated electrodeposition step. The third sub-pixel 706 has the same dimensions as the second sub-pixel 704.

Figure 4:
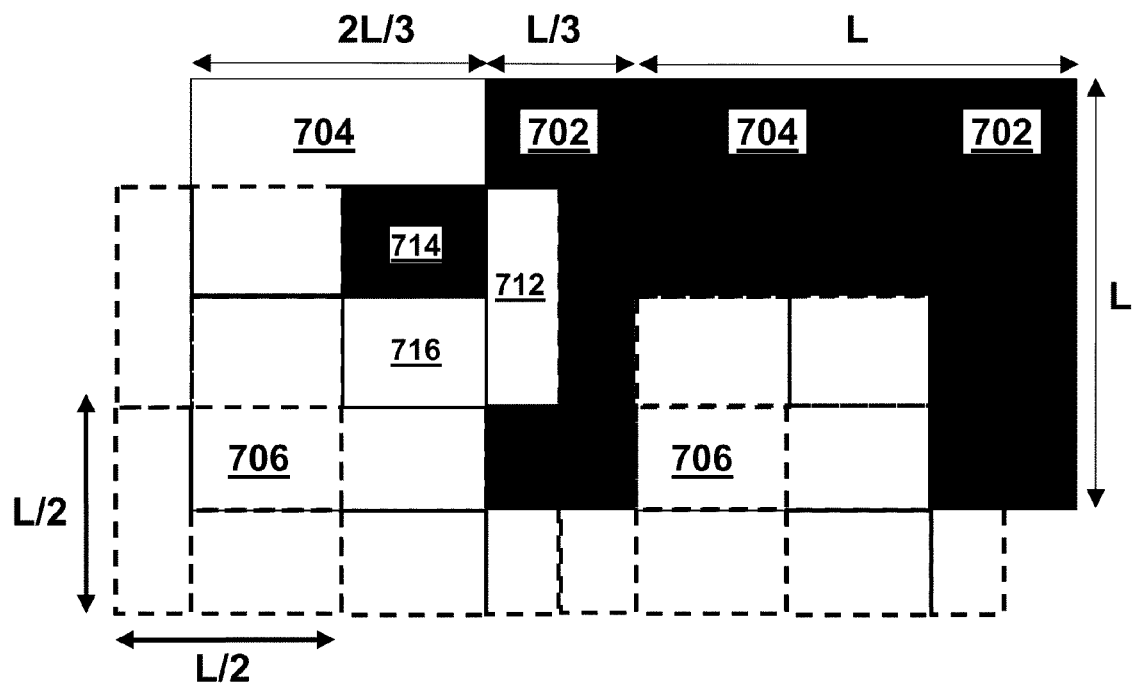
FIG. 4 illustrates the pixel arrangement of part of a display which can be produced from multiple copies of the pixel shown in FIG. 3.

However, the resolution of a display formed from the color pixel shown in FIG. 3 is not limited to the resolution (L in both dimensions) of the color pixel itself. As illustrated in FIG. 4, by careful choice of size and placement of the pixel electrodes in the backplane, it is possible to produce a display having twice the resolution (i.e., L/2 in both dimensions) of the color pixel itself.

FIG. 4 shows two color pixels of the type shown in FIG. 3 formed side-by-side. A single backplane pixel comprising sub-pixel electrodes 712, 714 and 716 is illustrated with the sub-pixel electrodes shaded; seven additional adjacent backplane pixels are delimited by broken lines.

As may readily be seen from FIG. 4, each backplane pixel is L/2 square, and comprises a first sub-pixel electrode 712 which overlaps one-fourth of the area of the first sub-pixel 702, a second sub-pixel electrode 714 which overlaps one-fourth of the area of the second sub-pixel 704, and a third sub-pixel electrode 716 which overlaps one-fourth of the area of the third sub-pixel 706. The three sub-pixel electrodes 712, 714 and 716 have the same shapes and orientations as the corresponding sub-pixels 702, 704 and 706 respectively, but are one-half the size so that, as shown in FIG. 4, the second sub-pixel electrode 714 covers the lower right quadrant of sub-pixel 704, and the third sub-pixel electrode 716 covers the upper right quadrant of sub-pixel 706, while the first sub-pixel electrode 712 covers part of the first sub-pixel 702 lying in the left-hand half of sub-pixel 702 and extending for a distance L/4 in each direction from the horizontal plane of symmetry of sub-pixel 702.

It will be seen from FIG. 4 that sub-pixel 714 has two neighboring sub-pixels of the same color (the sub-pixels along its top and left edges, as illustrated in FIG. 4), sub-pixel 716 has two neighboring sub-pixels of the same color (the sub-pixels along its left and bottom edges), and sub-pixel 712 has three neighboring sub-pixels of the same color (the sub-pixels along its top, right and bottom edges).

It should be noted that the pixel electrode immediately below the pixel electrode 712, 714, 716 has its sub-pixel electrodes arranged in the same manner as the sub-pixel electrodes 712, 714 and 716, whereas the pixel electrodes immediately to the left and right of the pixel electrode 712, 714, 716 have their sub-pixel electrodes laterally reversed relative to the sub-pixel electrodes 712, 714 and 716.

Thus, in the display shown in FIG. 4, the size of the areas having the same color differs from those of the sub-pixel electrodes. The present invention is not, however, restricted to color displays prepared in this manner but extends generally to color displays having this characteristic.

Figure 5:
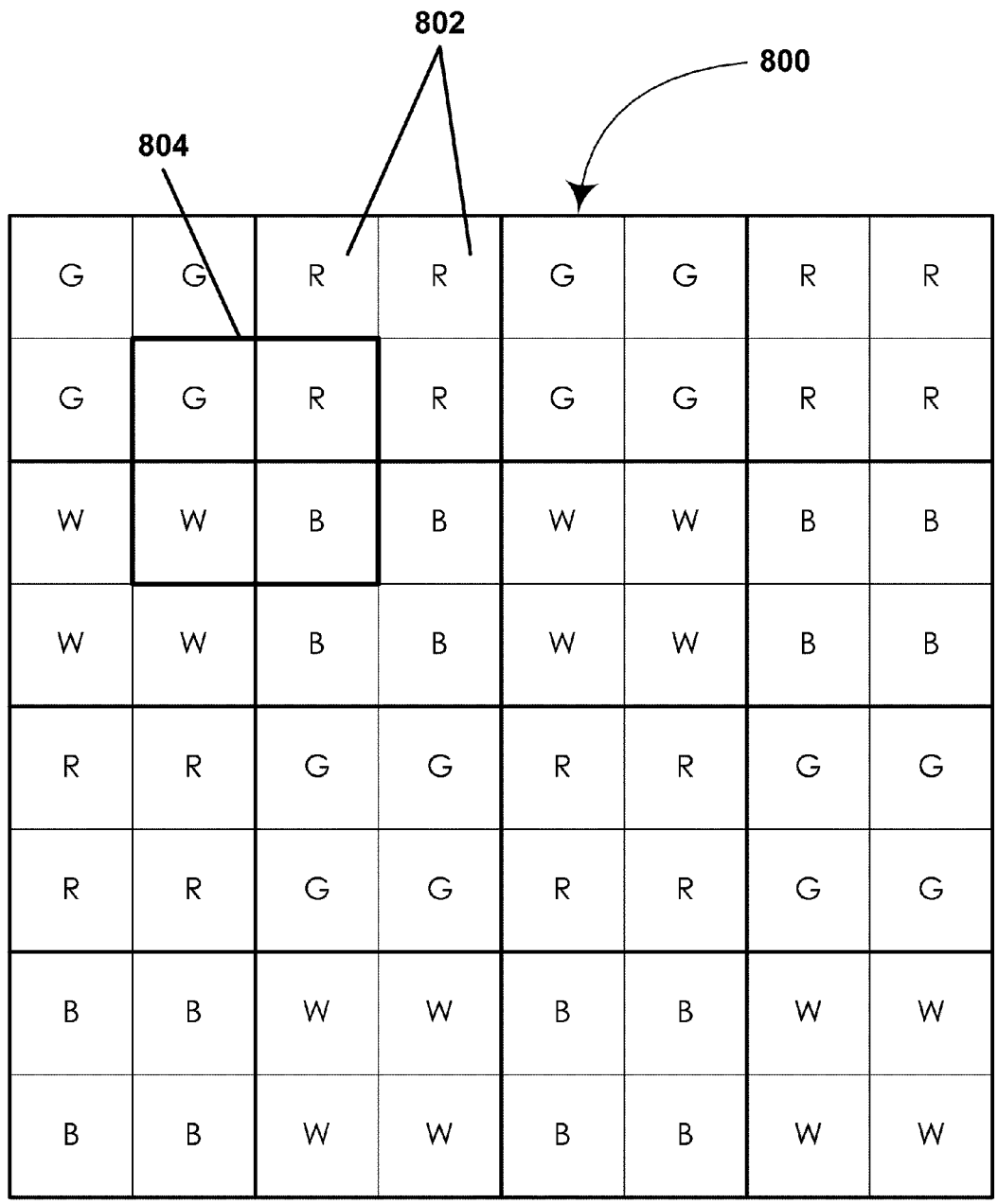
FIG. 5 is a top plan view of a preferred tetrachromatic display of the present invention which uses a tetrachromatic color filter superposed over a monochromatic electro-optic medium and a backplane.

A preferred display of this type is illustrated in FIG. 5. The display (generally designated 800) shown in FIG. 5 is a tetrachromatic color display having red, green, blue and white sub-pixels formed by a color filter array overlying a monochrome electro-optic medium. The individual colored areas (designated R, G, B and W respectively) of the color filter array each cover a 2×2 array of sub-pixel electrodes 802. Each color pixel of the display is formed from one-fourth of each of a red, green, blue and white colored area. For example, a color pixel 804 is outlined by a heavy square in FIG. 5. This colored pixel comprises the lower right-hand quadrant of a green colored area G, the lower left-hand quadrant of a red colored area R, the upper right-hand quadrant of a white "colored" area W and the upper left quadrant of a blue colored area B. Thus, a colored pixel is formed at every intersection of the color filter array at which red, green, blue, and white areas come together, and the four sub-pixels in each such colored pixel can be individually controlled since each sub-pixel overlies a single backplane sub-pixel electrode 802. It will be seen from FIG. 5 that each of the sub-pixels has neighboring sub-pixels of the same color along two of its adjacent edges.

Figure 6:
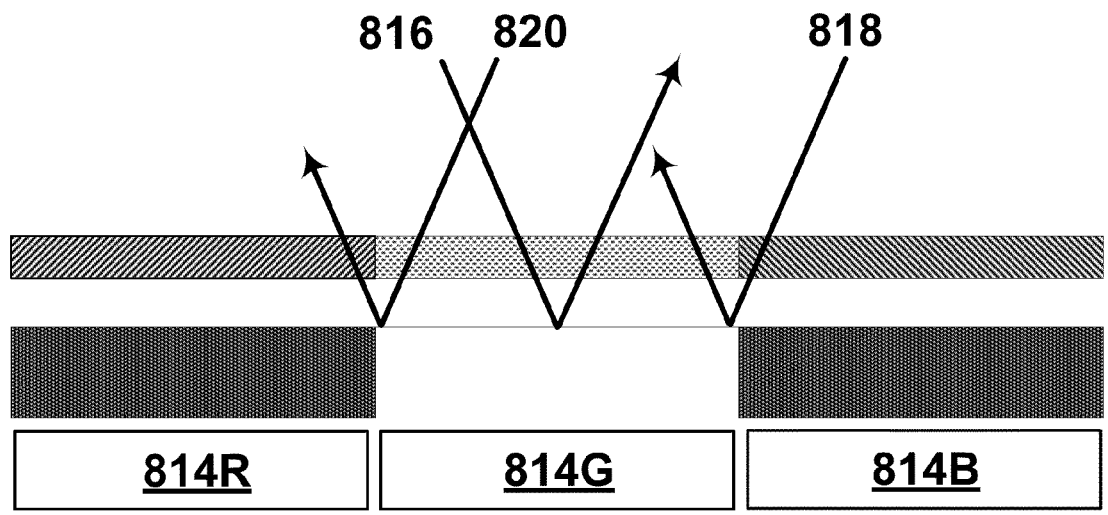
FIG. 6 is a schematic side section through part of an electro-optic display using a color filter array and illustrates how edge effects are produced.
Figure 7:
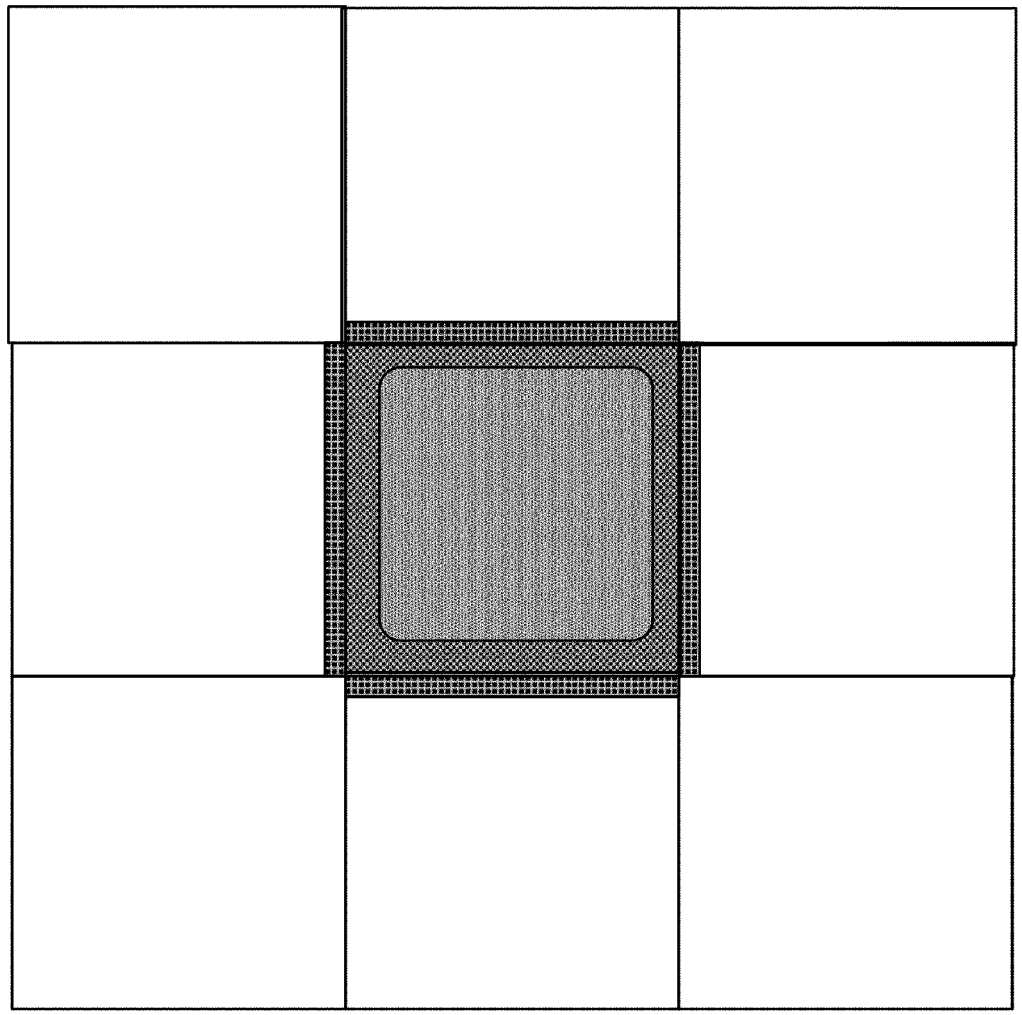
FIG. 7 is a top plan view of part of the display shown in FIG. 6 and illustrates the results of the edge effects.

FIGS. 6 and 7 illustrate the manner in which edge effects affect the color rendering of a display similar to that shown in FIG. 5, and explain why the display of FIG. 5 reduces such edge effects. For purposes of illustration, FIG. 6 shows a section of a color display in which red, green and blue sub-pixels of a color filter overlie a monochrome electro-optic medium 812, the sub-pixel areas of the electro-optic medium being switchable between their dark and light states by sub-pixel electrodes 814R, 814G and 814B respectively provided on a backplane (not shown).

FIG. 6 illustrates the section of the display shown set to a "green" state, in which the electrode 814G is set to cause the overlying section of the electro-optic medium 812 to appear white, while the electrodes 814R and 814B are set to cause the overlying sections of the electro-optic medium 812 to their dark states. Thus, when a ray 816 enters the display via a central section of the green sub-pixel of the color filter, this ray 816 passes through the green sub-pixel, is reflected from the light state electro-optic medium beneath, and passes back through the green sub-pixel of the color filter to be perceived by an observer as a green ray. (The manner in which ray 816 and the other rays shown in FIG. 6 are drawn is not intended to imply that reflection from the electro-optic medium is specular. Many electro-optic media, such as electrophoretic and electrochromic media, reflect in a Lambertian manner. However, the essential argument being regard to FIG. 6 is not affected by the difference between specular and Lambertian reflection.) However, consider a ray such as 818, which strikes the blue sub-pixel of the display, passes through this blue sub-pixel, strikes a peripheral portion of the light state electro-optic medium, and passes out of through the green sub-pixel. The effect of rays such as 818 is to make a peripheral area of the green sub-pixel adjacent the blue sub-pixel appear bluish green, as illustrated in FIG. 7. This is the aforementioned edge effect.

(It might at first glance appear that a ray, such as ray 818 in FIG. 6, which passed through both blue and green portions of the color filter would be completely absorbed by the color filter and would not produce the edge effect discussed above. While this is theoretically the case, the color filters used in electro-optic displays do not have completely saturated colors, i.e., the red portions of the color filter pass some green and some blue light, since using anything approaching completely saturated colors would render white areas of the display too dark. Hence, some of the blue light emerging from the blue sub-pixel does pass through the green sub-pixel leading to the edge effect noted above.)

Similar edge effects are produced by rays such as ray 820 in FIG. 6, which pass through the green sub-pixel, are reflected from the light electro-optic medium, and pass out through the red sub-pixel. In this case, the edge effect takes the form of a greenish-red color in a portion of the red sub-pixel adjacent the green sub-pixel.

FIG. 7 shows, in a highly schematic manner, the edge effects associated with the one sub-pixel located in the center of the Figure, and doe not show the edge effects associated with the other illustrated sub-pixels. Furthermore, FIG. 7 makes no attempt to illustrate the different color actually produced by the edge effects, only the areas affected. It will be seen from FIG. 7 that the result of the edge effects is to leave the central area of the sub-pixel displaying its intended color while a peripheral area, which may extend over the whole periphery of the sub-pixel. The edge effects are also responsible for color distortion in narrow strips along the edges of the other sub-pixels which share a common edge with the central sub-pixel.

It will readily be apparent from the foregoing explanation of the origin of edge effects that the color distortion caused by the edge effects only occurs at edges between sub-pixels of different colors. For example, if both the center and right-hand sub-pixels shown in FIG. 6 were green, rays such as ray 818 in FIG. 6 would not cause any color distortion along the edge between the two sub-pixels. Rays similar to ray 820 will cause a slight distortion of the size of the sub-pixel, since they will cause some green to appear outside the area of the relevant sub-pixel, but they will not cause color distortion.

In the display shown in FIG. 5, the edge effects are minimized because each colored sub-pixel has two of its four neighbors of the same color as itself, so that edge effects occur at only one-half of the edges between adjacent sub-pixels. The effective resolution of the display is increased to improve font rendering and for other purposes, but the color gamut is not reduced by increased edge effects.

This aspect of the present invention is not restricted to color displays using color filter arrays, but is also applicable to certain type of inherent color display. For example U.S. Pat. No. 6,933,098 describes an inherent microcell electrophoretic display which uses a single type of white electrophoretic particle suspending in the differently dyed liquids, the liquid being contained in separate microcells. Switching of this display is effected by moving the electrophoretic particles between a position adjacent a viewing surface (which causes the microcell to appear white) and a position remote from the viewing surface (which causes incident light to pass through the colored fluid, be reflected from the white electrophoretic particles and pass back through the fluid, so that the microcell takes on the color of the fluid). Thus each microcell, and hence each sub-pixel containing one or more microcells, is capable of displaying white and one other color. Other variations of inherent color displays use sub-pixels capable of displaying one selected color plus black. It should readily be apparent that both these type of inherent color display can suffer from edge effects produced in a manner very similar to those explained above with reference to FIGS. 6 and 7, and hence that modifying such a display in accordance with the present invention can produce useful improvement in the electro-optic characteristics of the display.

It will be apparent to those skilled in the technology of electro-optic displays that modification of color electro-optic displays in accordance with the present invention will require changes in the methods used to render images from outside sources (such as digital photographs) on the display. The presently preferred method is to process the image at the full resolution of the TFT and the corresponding color information is calculated from a neighborhood and reduced to the underlying CFA color only at the final step of the process.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. A color display having areas of at least three different colors, the areas of different colors forming continuous areas of a single color each covering a plurality of sub-pixel electrodes, the continuous areas of a single color and the sub-pixel electrodes being arranged such that the sub-pixels are rectangular and each sub-pixel of a given color has sub-pixels of the same given color disposed along at least two of its adjacent edges; the color display having continuous areas of three different colors, the continuous areas of a first color having the form of a series of spaced parallel stripes and the continuous areas of the second and third colors having the form of alternating rectangles of the second and third colors disposed in the spaces between the spaced parallel stripes of the first color.

2. A color display according to claim 1 having continuous areas of four different colors, each continuous area of a single color covering a 2×2 array of sub-pixel electrodes.

3. A color display according to claim 1 having red, green and blue colored areas.

4. A color display according to claim 1 having orange, lime and purple colored areas.

5. A color display according to claim 1 comprising a color filter array superposed on an electro-optic medium having light and dark optical states.

6. A color display according to claim 1 wherein the plurality of colored areas are provided by a plurality of differing electrophoretic media, whereby each of the differing electrophoretic media is capable of displaying at least one of white and black, and a color other than black or white.

7. A color display according to claim 1 comprising an electrophoretic material comprising a plurality of electrically charged particles disposed in a fluid and capable of moving through the fluid under the influence of an electric field.

8. A color display according to claim 7 wherein the electrically charged particles and the fluid are confined within a plurality of capsules or micro cells.

9. A color display according to claim 7 wherein the electrically charged particles and the fluid are present as a plurality of discrete droplets surrounded by a continuous phase comprising a polymeric material.

10. A color display according to claim 7 wherein the fluid is gaseous.

11. An electronic book reader, portable computer, tablet computer, cellular telephone, smart card, sign, watch, shelf label or flash drive comprising a display according to claim 1.

* * * * *